(12) United States Patent
Hirata et al.

(10) Patent No.: US 7,947,356 B2
(45) Date of Patent: May 24, 2011

(54) MOLDED FOAM AND MOLD

(75) Inventors: Yutaka Hirata, Yokohama (JP); Masahito Niitu, Ageo (JP)

(73) Assignee: Bridgestone Corporation, Tokyo (JP)

( * ) Notice: Subject to any disclaimer, the term of this patent is extended or adjusted under 35 U.S.C. 154(b) by 1122 days.

(21) Appl. No.: 11/711,054

(22) Filed: Feb. 27, 2007

(65) Prior Publication Data

US 2007/0281132 A1 Dec. 6, 2007

(30) Foreign Application Priority Data

Mar. 22, 2006 (JP) .................................. 2006-079067

(51) Int. Cl.
*B32B 3/30* (2006.01)
*A47C 7/18* (2006.01)

(52) U.S. Cl. ... 428/167; 428/158; 428/192; 297/228.12; 297/452.15; 297/452.26; 297/452.6

(58) Field of Classification Search .................. 428/167, 428/192, 158; 297/215.16, 228.12, 452.15, 297/452.26, 452.48, 452.6
See application file for complete search history.

(56) References Cited

U.S. PATENT DOCUMENTS

| | | | | |
|---|---|---|---|---|
| 3,370,117 A | * | 2/1968 | Blue | 264/321 |
| 5,945,200 A | * | 8/1999 | Suzuki | 428/192 |
| 6,391,424 B1 | * | 5/2002 | Suzuki | 428/167 |
| 6,428,095 B1 | | 8/2002 | Hirata | |
| 2002/0064627 A1 | * | 5/2002 | Tada et al. | 428/156 |
| 2005/0253293 A1 | | 11/2005 | Cathcart et al. | |

FOREIGN PATENT DOCUMENTS

| | | |
|---|---|---|
| CN | 1159500 A | 9/1997 |
| EP | 1 251 027 A2 | 10/2002 |
| JP | 9-156870 A | 3/1997 |
| JP | 11-34710 A | 2/1999 |
| JP | 2000-37739 A | 2/2000 |
| JP | 2005-324552 A | 11/2005 |

OTHER PUBLICATIONS

Chinese Office Action dated Apr. 22, 2010 (5 pages).

* cited by examiner

*Primary Examiner* — Donald Loney
(74) *Attorney, Agent, or Firm* — Sughrue Mion, PLLC

(57) ABSTRACT

A molded foam containing no voids and a mold for forming such a molded foam are provided. A molded foam 5 has an external corner 5a where a small rib 10 is formed and a recessed step 7 where thin plate-like ribs 11 are formed. The rib 10 has a triangular cross-sectional shape in a direction perpendicular to the longitudinal direction of the recessed step 7. The rib 10 is tapered from the base to an end thereof in a direction in which the rib 10 protrudes. The ribs 11 are arranged at intervals in the longitudinal direction of the recessed step 7.

9 Claims, 3 Drawing Sheets

MOLDED FOAM AND MOLD

FIELD OF THE INVENTION

The present invention relates to molded foams, such as car seat cushions, and molds for forming the molded foams.

BACKGROUND OF THE INVENTION

Car seat pads are formed by molded polyurethane foam (for example, Japanese Unexamined Patent Application Publication No. 2000-37739).

Some car seat pads have backboards on the bottom surfaces thereof. FIG. 3 illustrates a method for forming a seat pad having a backboard.

Referring to FIG. 3a, a mold 1 includes a bowl 2 and lids 3 and 4. A polyurethane precursor solution R is poured into the bowl 2. The lids 3 and 4 are closed to the bowl 2 before polyurethane reaction by heating. Referring to FIG. 3b, a molded foam 5A is formed after the expansion and is released from the mold 1. Referring to FIG. 3c, a seat pad is completed by attaching a backboard 6 to the molded foam 5A. In FIG. 3c, the seat pad is illustrated upside down with respect to the orientation for installation in a vehicle.

An edge of the backboard 6 engages with a recessed step 7 formed in the bottom surface of the molded foam 5A (in the top surface in the drawings). Numeral 5a denotes an external corner left after the step 7 is formed. The upper mold portion 4 has a projecting step 8 for forming the recessed step 7. The projecting step 8 is L-shaped in cross section.

For the molded foam 5A shown in FIGS. 3a to 3c, the projecting step 8 of the lid 4 makes it difficult to sufficiently fill an internal corner 8a with expanding polyurethane. The projecting step 8 thus tends to cause air to be left around the external corner 5a of the molded foam 5A, which is formed by the internal corner 8a of the lid 4.

SUMMARY OF THE INVENTION

An object of the present invention is to provide a molded foam containing no voids and a mold for forming such a molded foam.

A molded foam according to a first aspect of the present invention has an external corner where a small rib protrudes outward.

The rib may extend along a ridge of the external corner.

The cross-sectional shape of the rib in a direction perpendicular to the longitudinal direction of the ridge may be tapered to an end of the rib in a direction in which the rib protrudes.

The rib may have a triangular cross-sectional shape.

Part of the rib may be adjacent to a parting line.

The molded foam may be used as a car seat pad with the external corner positioned in a bottom surface of the seat pad.

A mold according to a second aspect for forming the molded foam according to the first aspect has a recess for forming the external corner.

A molded foam according to a third aspect has a groove in an outer surface thereof. The molded foam includes one or more thin plate-like ribs connected to first and second surfaces of the groove which define the deepest portion thereof.

The molded foam according to the third aspect may be a car seat pad.

The groove may be a step for engagement with a backboard.

The groove may extend along an overhang.

The ribs may be arranged at intervals in the longitudinal direction of the groove.

A mold according to a fourth aspect for forming the molded foam according to the third aspect has a ridge for forming the groove and one or more recesses disposed in the ridge for forming the ribs.

DETAILED DESCRIPTION

The molded foam according to the first aspect, which can be formed using the mold according to the second aspect, has the small rib at the external corner thereof. An expanding resin, such as polyurethane, pushes air left around an internal corner of the mold for forming the external corner into the rib. The expanding resin can therefore sufficiently fill the external corner. The rib is not noticeable when positioned on the bottom surface of a seat pad. In addition, the rib does not hinder attachment of a backboard to the seat pad.

The molded foam according to the third aspect, which can be formed using the mold according to the fourth aspect, includes the thin plate-like ribs connected to the first and second surfaces of the groove. In the molding of the molded foam, the first and second surfaces are connected through the recesses for forming the ribs. This allows an expanding resin to flow smoothly around the first and second surfaces during the molding, thus avoiding residual air.

Figure 1A:
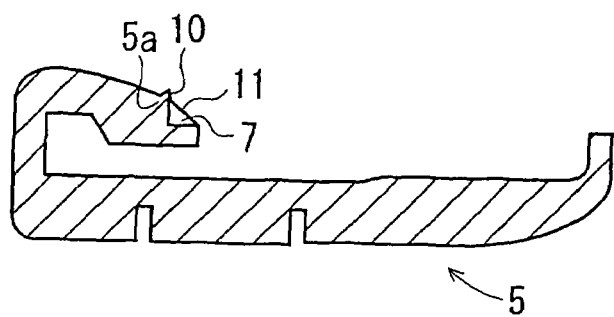
FIG. 1a is a longitudinal sectional view of a seat pad according to an embodiment.
Figure 1B:
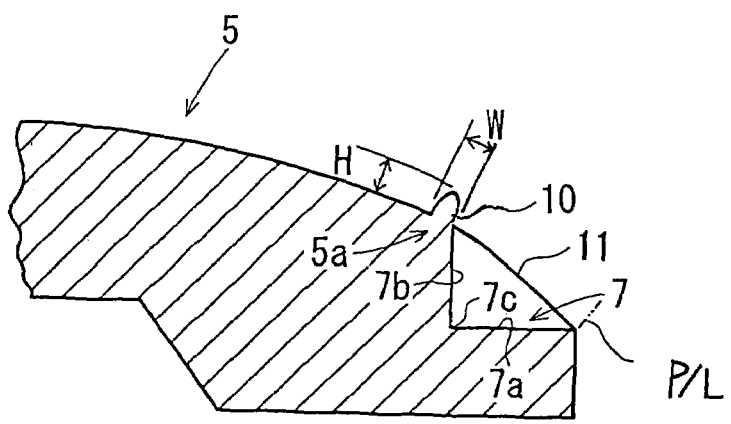
FIG. 1b is an enlarged view of ribs shown in FIG. 1a and the vicinity thereof.
Figure 2:
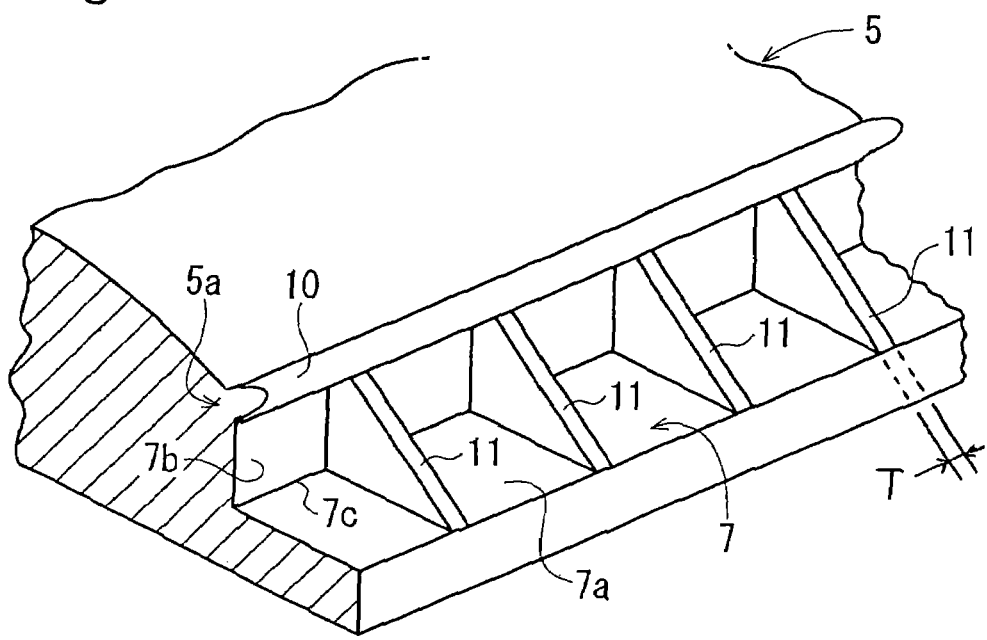
FIG. 2 is a perspective view of the ribs shown in FIG. 1 and the vicinity thereof.

Embodiments of the present invention will now be described with reference to the drawings. FIG. 1a is a longitudinal sectional view of a car seat pad according to an embodiment. In FIG. 1a, the seat pad is illustrated upside down with respect to the orientation for installation in a vehicle. FIG. 1b is an enlarged view of ribs shown in FIG. 1a and the vicinity thereof. FIG. 2 is an enlarged perspective view of the ribs and the vicinity thereof.

In this embodiment, a molded foam 5 has an external corner 5a where a small rib 10 is formed and a recessed step 7 where thin plate-like ribs 11 are formed. In this embodiment, the recessed step 7 corresponds to a groove according to the present invention, and the deepest portion 7c of the recessed step 7 corresponds to the deepest portion of the groove. The deepest portion 7c of the recessed step 7 is defined between a first surface 7a that is horizontal in the drawings and a second surface 7b that is vertical in the drawings.

The rib 10 extends along the recessed step 7. The rib 10 protrudes outward from a ridge of the external corner 5a between the second surface 7b and the bottom surface of the molded foam 5 (the top surface in the drawings). The rib 10 has a triangular cross-sectional shape in a direction perpendicular to the longitudinal direction of the recessed step 7. The rib 10 is tapered from the base to an end thereof in a direction in which the rib 10 protrudes.

The triangular shape of the rib 10 preferably has a base width W of about 1.0 to 5.0 mm, particularly, about 2.5 to 3.0 mm, and a height H of about 1.0 to 5.0 mm, particularly, about 2.0 to 3.0 mm.

The rib does not necessarily have to be triangular; it may also be, for example, trapezoidal, semicircular, semielliptical, or pentagonal.

The rib 10 is formed integrally with the molded foam 5 in foam molding. Although not illustrated, the mold used has a mold groove (recess) for forming the rib 10.

The ribs 11 are thin plates formed in a right-angled triangle and connected to the first surface 7a and the second surface 7b. The ribs 11 preferably have a thickness T of about 1.0 to 10.0 mm, particularly, about 3.0 to 4.0 mm. The ribs 11 are arranged at intervals in the longitudinal direction of the recessed step 7. The ribs 11 are preferably arranged at intervals of about 10.0 to 200.0 mm, particularly, about 40.0 to 50.0 mm. The ribs 11 are adjacent to a parting line P/L.

The ribs 11 are formed integrally with the molded foam 5. Although not illustrated, the mold used has mold grooves (recesses) for forming the ribs 11 in the projecting step 8. The shape of the mold grooves corresponds to that of the ribs 11. The rest of the structure of the molded foam 5 is the same as that of the molded foam 5A shown in FIGS. 3a to 3c, and the same reference characters indicate the same portions.

Figure 3A:
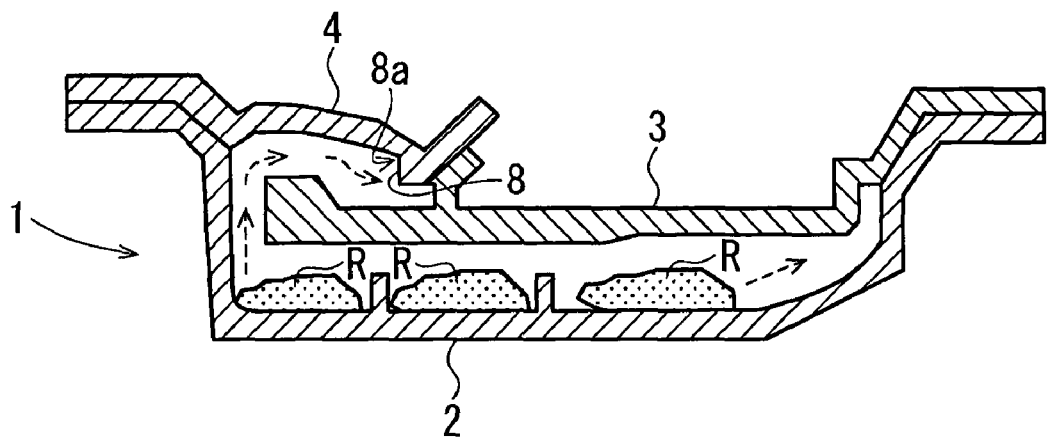
FIGS. 3a to 3c are diagrams showing an example of the known art.
Figure 3B:
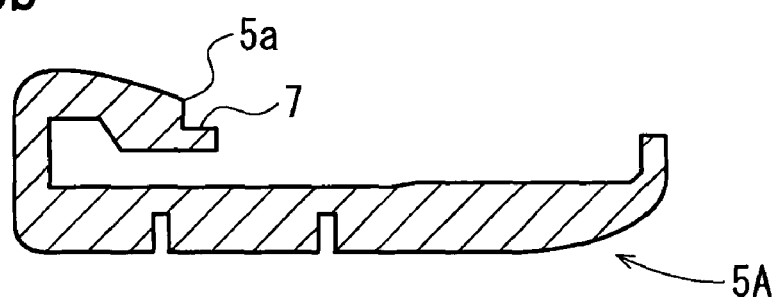
Figure 3C:
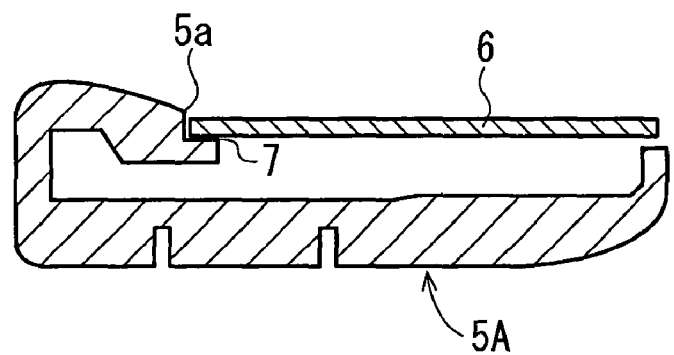

The mold used for forming the molded foam 5 in FIGS. 1a and 1b has the same structure as the mold shown in FIG. 3a except the mold grooves (recesses) for forming the ribs 10 and 11.

In the molding of the molded foam 5, a resin expanding toward the internal corner 8a pushes air left therearound into the mold grooves (recesses) for forming the ribs 10 and 11. The expanding resin can therefore sufficiently fill the internal corner 8a to form the molded foam 5 without causing defects due to residual air.

At least either the rib 10 or the ribs 11 may be formed using a mold having at least either the mold groove for forming the rib 10 or the mold grooves for forming the ribs 11.

The rib 10, which is small, does not hinder the attachment of the backboard 6. The ribs 11, which are thin, can be crushed under the backboard 6 when the backboard 6 is attached, so that the backboard 6 can be stacked on the first surface 7a of the recessed step 7. The ribs 11 thus do not hinder the attachment of the backboard 6.

Figure 4:
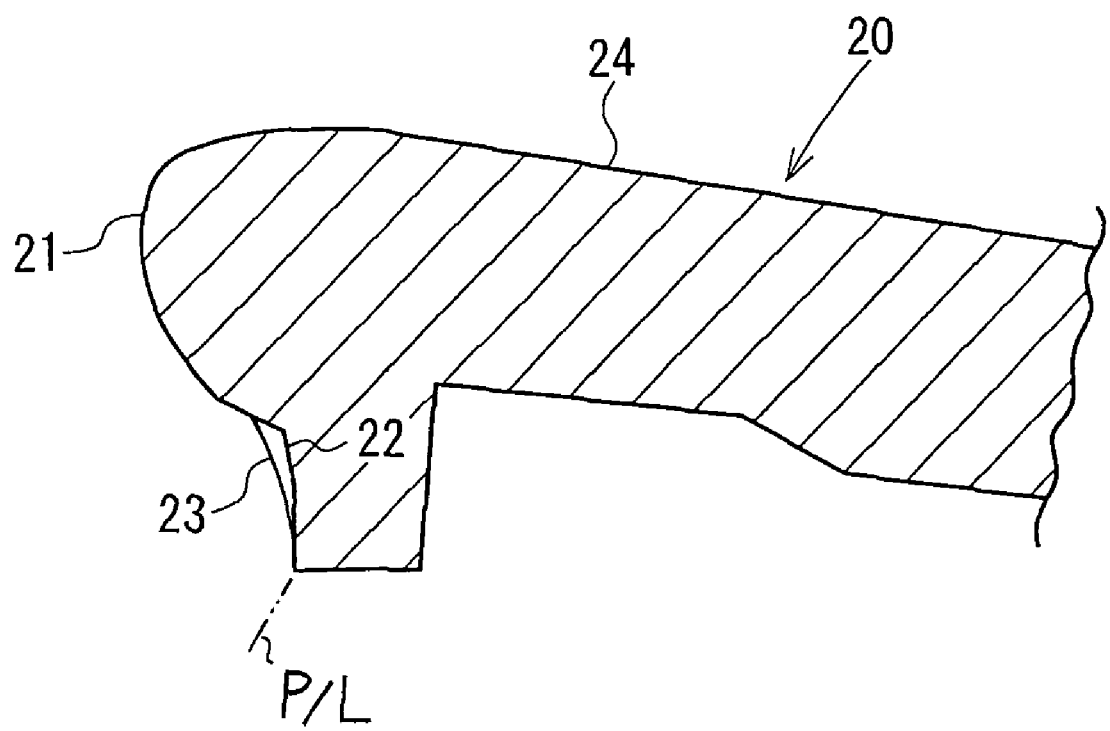
FIG. 4 is a partial longitudinal sectional view of a seat pad according to another embodiment.

In FIGS. 1a to 2, the ribs are formed near the recessed step 7, which is used to attach the backboard 6. As shown in FIG. 4, ribs 23 may be formed in a groove 22 under an overhang 21 on the side of a seat cushion pad 20.

FIG. 4 is a longitudinal sectional view of the front end of the seat cushion pad 20. In FIG. 4, the seat cushion pad 20 is illustrated in the orientation for installation in a vehicle. Numeral 24 denotes a seating surface. Character P/L denotes a parting line.

The ribs 23 are thin triangular plates arranged at intervals in the longitudinal direction of the groove 22 (perpendicularly to the page of FIG. 4). The ribs 23 are formed integrally with the seat pad 20. A mold used for forming the seat pad 20 has mold grooves (recesses) for forming the ribs 23. The shape of the mold grooves corresponds to that of the ribs 23. The ribs 23 prevent formation of defects due to residual air near the grooves 22.

Although the embodiments described above relate to seat pads, the present invention can also be applied to other molded foams and molds used therefor.

The present application is based on Japanese Patent Application No. 2006-79067, filed on Mar. 22, 2006, the entire contents of which are incorporated herein by reference.

The invention claimed is:

1. A molded foam comprising a recessed, step-shaped groove in an outer surface thereof, the molded foam comprising one or more thin plate-like ribs connected to first and second surfaces of the groove which define the deepest portion thereof and wherein the molded foam is a car seat pad.

2. The molded foam according to claim 1, wherein the groove is a step for engagement with a backboard.

3. The molded foam according to claim 1, wherein the groove extends along an overhang.

4. The molded foam according to claim 1, wherein the ribs are arranged at intervals in the longitudinal direction of the groove.

5. A mold for forming the molded foam according to claim 1, the mold having a ridge for forming the groove and one or more recesses disposed in the ridge for forming the ribs.

6. The molded foam according to claim 1, wherein part of the rib is adjacent to a parting line.

7. The molded foam according to claim 1, wherein the rib is a triangular plate.

8. The molded foam according to claim 1, wherein the first surface and the second surface meet at a recessed corner, the corner forming the deepest part of the groove, and
wherein the groove is open substantially opposite to the each of the first surface and the second surface.

9. The molded foam according to claim 1, wherein the groove is formed at an external corner of the foam, the first surface being substantially parallel to a front surface of the external corner, and the second surface being substantially parallel to a top surface of the external corner.

* * * * *